United States Patent
Shirakawa

(10) Patent No.: US 8,963,964 B2
(45) Date of Patent: Feb. 24, 2015

(54) COMPUTER-READABLE STORAGE MEDIUM HAVING DISPLAY CONTROL PROGRAM STORED THEREIN, DISPLAY CONTROL METHOD, DISPLAY CONTROL SYSTEM, AND DISPLAY CONTROL APPARATUS

(75) Inventor: Eiichi Shirakawa, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 167 days.

(21) Appl. No.: 13/198,086

(22) Filed: Aug. 4, 2011

(65) Prior Publication Data

US 2012/0313976 A1 Dec. 13, 2012

(30) Foreign Application Priority Data

Jun. 13, 2011 (JP) .................................. 2011-131683

(51) Int. Cl.
*G09G 5/00* (2006.01)
*G06F 3/14* (2006.01)
*G09G 5/14* (2006.01)

(52) U.S. Cl.
CPC ................ *G06F 3/1423* (2013.01); *G09G 5/14* (2013.01)
USPC ......................................... 345/684; 715/784

(58) Field of Classification Search
CPC .. G06F 3/0485–3/04855; G06F 3/048–3/0481
See application file for complete search history.

(56) References Cited

U.S. PATENT DOCUMENTS

| 4,713,697 | A  | * | 12/1987 | Gotou et al. ............... | 348/208.7 |
| 6,307,573 | B1 | * | 10/2001 | Barros ......................... | 715/764 |
| 8,300,068 | B2 | * | 10/2012 | Yamada ....................... | 345/681 |
| 8,468,469 | B1 | * | 6/2013 | Mendis et al. .............. | 715/863 |
| 2009/0160873 | A1 | * | 6/2009 | Kew et al. .................... | 345/629 |
| 2010/0107116 | A1 | * | 4/2010 | Rieman et al. .............. | 715/784 |
| 2011/0197200 | A1 | * | 8/2011 | Huang et al. ................. | 719/313 |

FOREIGN PATENT DOCUMENTS

| JP | 2005-44036 | 2/2005 |
| JP | 2010-097326 | 4/2010 |

OTHER PUBLICATIONS

English translation of JP2005-44036, 30 pages.

* cited by examiner

*Primary Examiner* — David H Chu
(74) *Attorney, Agent, or Firm* — Nixon & Vanderhye, P.C.

(57) ABSTRACT

A computer-readable storage medium having stored therein a program that is executed by a computer using a display section and an input section for designating a position on a screen of the display section. The program causes the computer to operate as: means for displaying at least a part of a first content and a second content such that a first region defined by the first content includes a second region for displaying the second content; means for determining, on the basis of a position designated by the input section, whether or not a criterion concerning the input is met; and means for switching between a first mode in which the input operation changes a display form of the first content, and a second mode in which the input operation changes a display form of the second content within the second region, depending on a result of the determination.

14 Claims, 10 Drawing Sheets

COMPUTER-READABLE STORAGE MEDIUM HAVING DISPLAY CONTROL PROGRAM STORED THEREIN, DISPLAY CONTROL METHOD, DISPLAY CONTROL SYSTEM, AND DISPLAY CONTROL APPARATUS

CROSS REFERENCE TO RELATED APPLICATION

The disclosure of Japanese Patent Application No. 2011-131683, filed on Jun. 13, 2011, is incorporated herein by reference.

BACKGROUND OF THE INVENTION

1. Field of the Invention

The present invention relates to a computer-readable storage medium having a display control program stored therein, a display control method, a display control system, and a display control apparatus. Specifically, the present invention relates to a computer-readable storage medium having a display control program stored therein, a display control method, a display control apparatus, and a display control system, for controlling an input operation performed on an input section capable of designating a position on a screen of a display section and a display process performed on the display section in accordance with the input operation.

2. Description of the Background Art

In the conventional art (e.g., Japanese Laid-Open Patent Publication No. 2005-44036 (hereinafter, referred to as Patent Document 1)), it is known that one scroll target region is selected from among a plurality of scroll target regions. Patent Document 1 states that a drag operation is detected on the selected scroll target region, the direction and length of the detected drag operation are obtained, and a target image displayed in the scroll target region is scrolled on the basis of the obtained direction and length.

In the conventional art as described in Patent Document 1, when a plurality of contents overlap with each other within the selected scroll target region, even if only one content is intended to be scrolled, another content may be scrolled. Thus, a user cannot perform an intended operation, and hence usability is deteriorated.

SUMMARY OF THE INVENTION

Therefore, it is an object of the present invention to provide a novel display control apparatus, a novel computer-readable storage medium having a display control program stored therein, a novel display control method, and a novel display control system, for improving usability.

In order to attain the object mentioned above, the present invention can be provided, as an example, in the following aspects. The following specific description is in all aspects illustrative for the understanding of the extent of the present invention, and is not intended to be limited thereto. That is, it is understood that, from the specific description, the one skilled in the art can implement the present invention in the equivalent range based on the description of the present invention and on the common technological knowledge.

In one aspect, the present invention provides a computer-readable storage medium having stored therein a display control program that is executed by a computer capable of using a display section and an input section capable of designating a position on a screen of the display section. The display control program causes the computer to operate as first display control means, first determination means, and second display control means. The first display control means displays at least a part of a first content and a second content that are indicated by display object data that is configured such that a first region defined by the first content includes a second region for displaying the second content. The first determination means determines, on the basis of a position designated by the input section, whether or not an input operation of a user indicated by the position meets a predetermined criterion. The second display control means switches between a first mode in which at least a display form of the first content displayed on the display section is capable of being changed by an input operation on the input section, and a second mode in which a display form of the second content within the second region displayed on the display section is capable of being changed by an input operation on the input section, in accordance with a result of the determination of the first determination means.

In one embodiment, the second mode may be a mode in which the display form of the first content displayed on the display section is not changed and the display form of the second content within the second region displayed on the display section is capable of being changed by an input operation on the input section.

In various embodiments, the first mode is a mode in which the display form of the second content within the second region displayed on the display section is not changed and the display form of the first content displayed on the display section is capable of being changed by an input operation on the input section.

In various embodiments, the second content may be a content having a area required for a display and the area is larger than a area of the second region.

In one embodiment, the first determination means may determine, on the basis of a position designated by the input section, whether or not an input operation of the user indicated by the position is an input operation in which a position within a predetermined region in the second region is continuously pointed to for a time longer than a set time.

In one embodiment, the first determination means may determine, on the basis of a position designated by the input section, whether or not an input operation of the user indicated by the position is an input operation in which a position within a predetermined region in the second region is intermittently and consecutively pointed to within a set time a predetermined number of times or more.

In various embodiments, in the first mode, a relative position of the first content relative to the display section may be changed in accordance with an input operation on the input section, and in the second mode, the relative position of the second content relative to the second region displayed on the display section may be changed in accordance with an input operation on the input section.

In various embodiments, the display control program may further cause the computer to operate as second determination means for determining whether or not the input operation meets a predetermined criterion, after the second mode is set on the basis of the determination of the first determination means, and when a result of the determination of the second determination means is positive, the second display control means may change a display form under a setting of the first mode in accordance with a position designated by an input operation after the determination of the second determination means.

In the above embodiments, the second determination means may determine whether or not the input operation is an input operation that designates a position outside the second region.

In the above embodiment, after the second mode is set on the basis of the determination of the first determination means, the second determination means may determine whether the input operation is not a drag operation performed from a position within the second region to a position outside the second region and is an input operation that designates a position outside the second region.

In another aspect, a display control method executed in accordance with the aforementioned display control program is also included within the scope of the present invention. In addition, a display control system or display control apparatus including the aforementioned display control program is also another aspect of the present invention.

(Regarding Terms Used Particularly in The Present Specification)

As used herein, the term "computer-readable storage medium" indicates any apparatus or medium capable of storing a program, a code, and/or data to be used in a computer system. The computer-readable storage medium may be any one of a volatile device and a nonvolatile device as long as it can be read by a computer system. Examples of computer-readable storage media include, but not limited to, a magnetic tape, a hard disc drive (HDD), a compact disc (CD), a digital versatile disc (DVD), a Blu-ray disc (BD), a semiconductor memory.

As used herein, the term "system" (for example, a game system, or an information processing system) may include one apparatus, or may include a plurality of apparatuses each of which can communicate with another one of the apparatuses.

As used herein, a state where an apparatus or system is "connected" to another apparatus or system is not limited to a state of being connected by a line, and can include a state of being wirelessly connected.

As used herein, a "scrolling function" refers to a function of a display device to move the user's view across the whole image of display object data (e.g., image data) such that a displayed part of the image is accordingly changed on the display region of the display device.

As used herein, a touch screen or touch panel is a kind of an input device including a display section and an input section capable of designating a position on which an input operation is performed on the display section (e.g., a position that can be designated by a coordinate system that defines a display region). In other words, the input device has two functions of the display section and the input section. The input device not only displays, on the display section, image information received from an information processing apparatus; but also senses and outputs as a signal, screen position information that corresponds to a user's touch with a finger, stylus (also called touch pen) or the like to a region of the display section. The information processing apparatus having received the signal reflects the desired motion of the operator in the information processing on the basis of information of the position on the screen.

Further, in an input operation performed on the input device such as a touch screen or a touch panel by a touching motion of a finger or the like, "touch-on" refers to a shift from a state where a touch of a finger or the like on the display section of the input device is not being detected to a state where the input section is detecting the touch, or an internal state of the input device that begins at this detection. "Touch-off" refers to a shift from a state where a touch of a finger or the like on the display section of the input device is being detected to a state where the input section is not detecting the touch, or an internal state of the input device that begins at this nondetection.

A position on the display section that is detected by the input section when it is determined as touch-on is referred to as a "touch-on position". Meanwhile, a position on the display section that is detected last by the input section when it is determined as touch-off is referred to as a "touch-off position".

As used herein, "single touch" refers to a touching operation on the input section of the input device which touching operation is implemented in a minimum temporal unit that allows the input device such as a touch screen or a touch panel to detect whether or not the input operation is performed.

As used herein, a "long pressing operation" refers to an input operation implemented by a state where an input operation on a display section such as a touch screen or a touch panel is detected at a coordinate in a predetermined region continuously for a time longer than a set time. Here, the set time is arbitrary.

According to the present invention, a novel computer-readable storage media and the like for improving usability are provided.

These and other objects, features, aspects and advantages of the present invention will become more apparent from the following detailed description of the present invention when taken in conjunction with the accompanying drawings.

DESCRIPTION OF THE PREFERRED EMBODIMENTS (Outline of Exemplified Embodiment of Present Invention)

In an exemplified embodiment, the present invention is implemented as an information processing apparatus having a computer that is capable of using a display section and an input section capable of designating a position on a screen of the display section. As an example of the information processing apparatus, a below-described game apparatus 10 will be described.

The game apparatus 10 is capable of handling, for example, display object data that is configured such that a first region defined by a first content includes a second region for displaying a second content. Here, it suffices that the number of regions defined by the display object data configured thus is a plural number, and the number is an arbitrary number. Examples of such display object data include, but are not limited to, a web page having various contents in a predetermined style and layout.

Hereinafter, first, an exemplified configuration of the game apparatus 10 will be described.

(Example of Exemplified Configuration of Game Apparatus)

Figure 1:
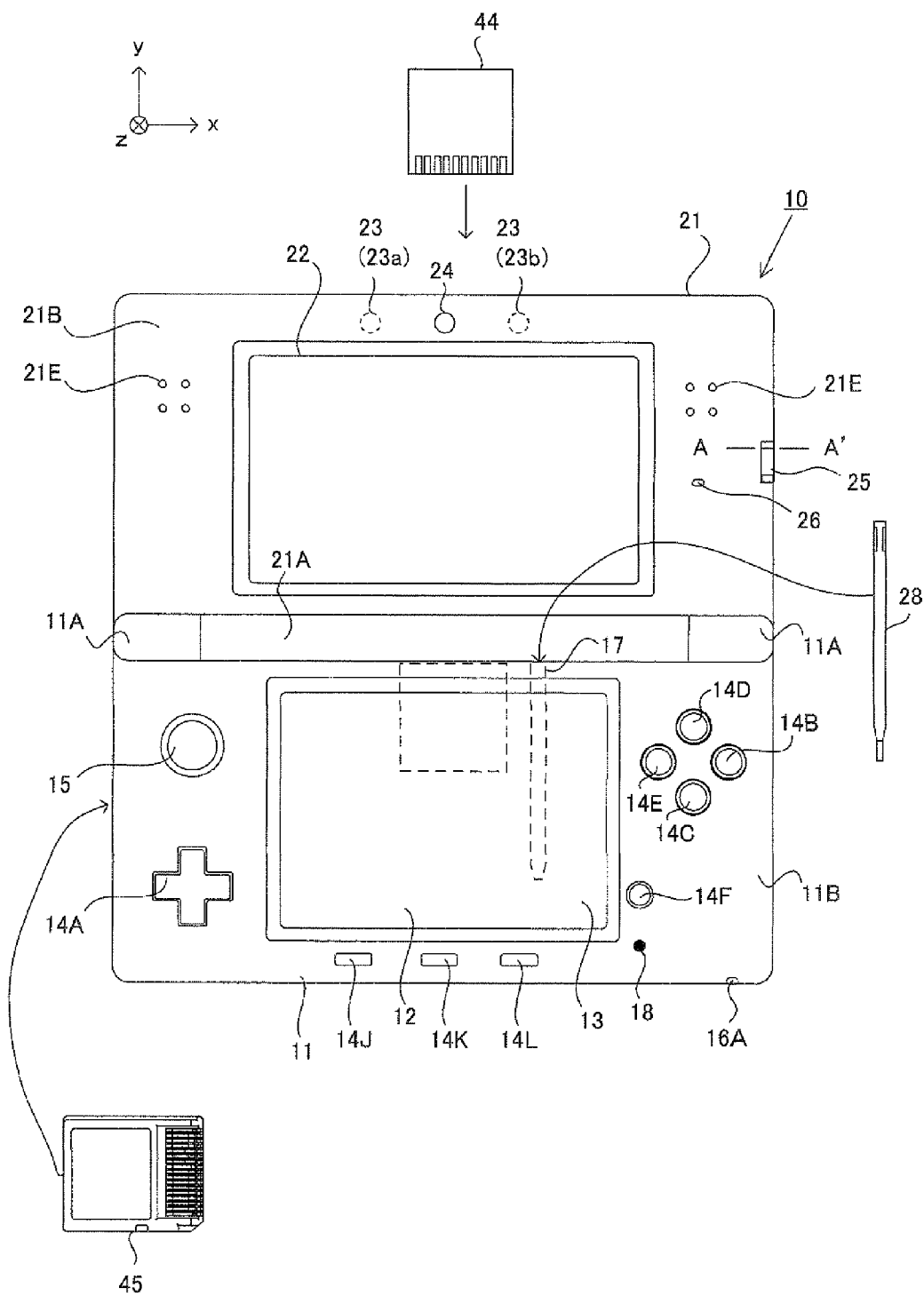
FIG. 1 is a front view of a game apparatus 10 in an opened state.
Figure 2:
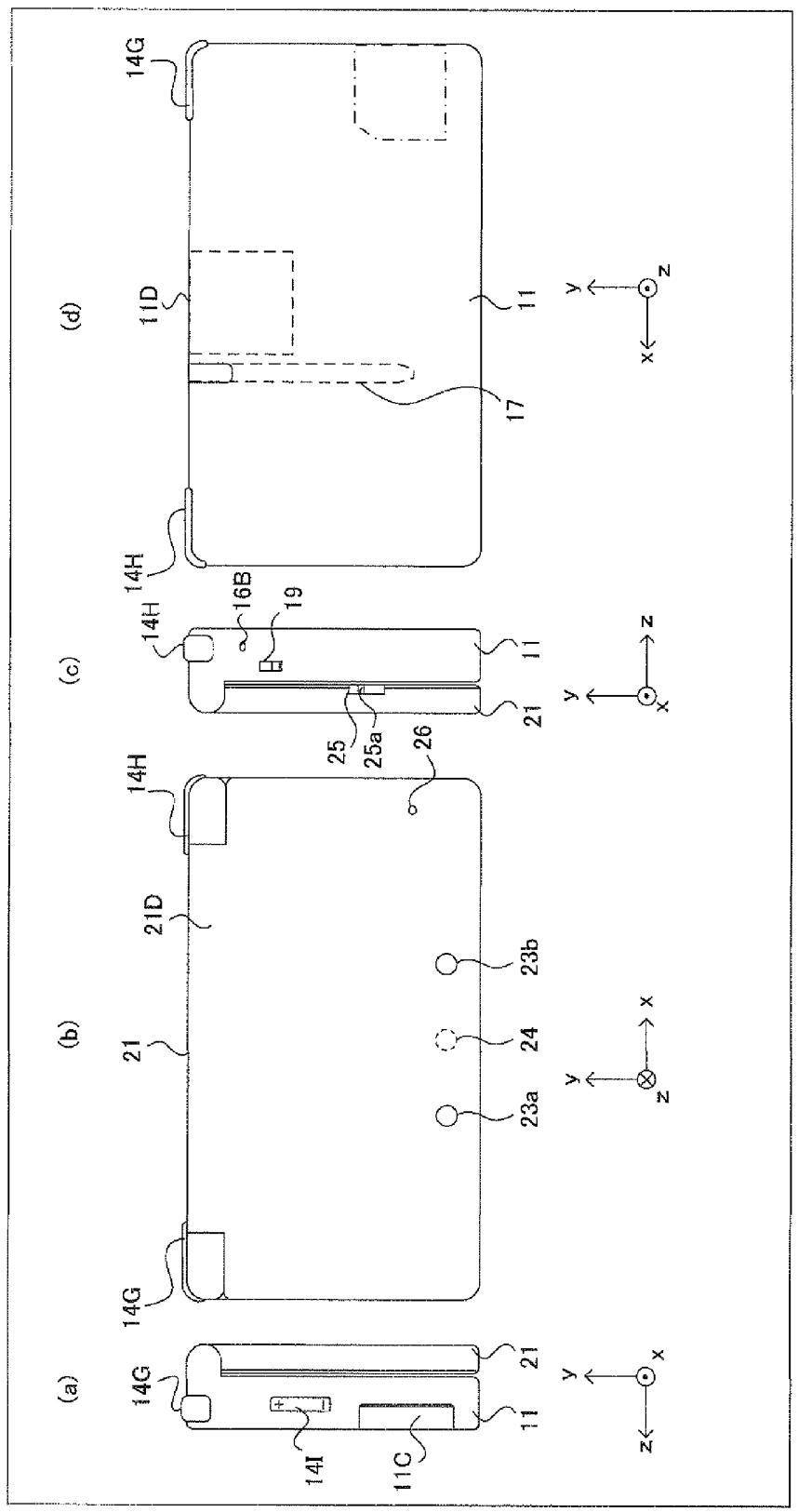
FIG. 2 is a left side view, a front view, a right side view, and a rear view of the game apparatus 10 in a closed state.

FIGS. 1 and 2 are each a plan view of an outer appearance of a game apparatus 10. The game apparatus 10 is a hand-held game apparatus, and is configured to be foldable as shown in FIGS. 1 and 2. FIG. 1 shows the game apparatus 10 in an opened state, and FIG. 2 shows the game apparatus 10 in a closed state.

FIG. 1 is a front view of the game apparatus 10 in the opened state. The game apparatus 10 can execute a game program which is stored in an detachable memory card (e.g., a below-described external memory 44) or a game program which is received from a server or another game apparatus or stored in a built-in storage area (e.g., a below-described internal data storage memory 35), and can display, on the screen, an image generated by computer graphics processing, such as an image taken by a virtual camera set in a virtual space, for example. The game apparatus 10 is able to take an image by means of an imaging section, display the taken image on a screen, and store data of the taken image.

Initially, an external structure of the game apparatus 10 will be described with reference to FIGS. 1 and 2. The game apparatus 10 includes a lower housing 11 and an upper housing 21 as shown in FIGS. 1 and 2. The lower housing 11 and the upper housing 21 are connected to each other so as to be openable and closable (foldable).

(Description of Lower Housing)

Initially, a structure of the lower housing 11 will be described. As shown in FIGS. 1 and 2, in the lower housing 11, a lower LCD (Liquid Crystal Display) 12, a touch panel 13, operation buttons 14A to 14L, an analog stick 15, an LED 16A and an LED 16B, an insertion opening 17, and a microphone hole 18 are provided. Hereinafter, these components will be described in detail.

As shown in FIG. 1, the lower LCD 12 is accommodated in the lower housing 11. The number of pixels of the lower LCD 12 may be, for example, 320 dots×240 dots (the longitudinal line×the vertical line). The lower LCD 12 is a display device for displaying an image in a planar manner (not in a stereoscopically visible manner), which is different from the upper LCD 22 as described below. Although an LCD is used as a display device in the present embodiment, any other display device such as a display device using an EL (Electro Luminescence), or the like may be used. In addition, a display device having any resolution may be used as the lower LCD 12.

As shown in FIG. 1, the game apparatus 10 includes the touch panel 13 as an input device. The touch panel 13 is mounted on the screen of the lower LCD 12. In the present embodiment, the touch panel 13 may be, but is not limited to, a resistive film type touch panel.

A touch panel of any type such as electrostatic capacitance type may be used. In the present embodiment, the touch panel 13 has the same resolution (detection accuracy) as that of the lower LCD 12. However, the resolution of the touch panel 13 and the resolution of the lower LCD 12 may not necessarily be the same. Further, the insertion opening 17 (indicated by dashed line in FIGS. 1 and 2(d)) is provided on the upper side surface of the lower housing 11. The insertion opening 17 is used for accommodating a touch pen 28 which is used for performing an operation on the touch panel 13. Although an input on the touch panel 13 is usually made by using the touch pen 28, a finger of a user may be used for making an input on the touch panel 13, in addition to the touch pen 28.

The operation buttons 14A to 14L are each an input device for making a predetermined input. As shown in FIG. 1, among operation buttons 14A to 14L, a cross button 14A (a direction input button 14A), a button 14B, a button 14C, a button 14D, a button 14E, a power button 14F, a selection button 14J, a HOME button 14K, and a start button 14L are provided on the inner side surface (main surface) of the lower housing 11. The cross button 14A is cross-shaped, and includes buttons for indicating an upward, a downward, a leftward, or a rightward direction. The button 14A to 14E, the selection button 14J, the HOME button 14K, and the start button 14L are assigned functions, respectively, in accordance with a program executed by the game apparatus 10, as necessary. For example, the cross button 14A is used for selection operation and the like, and the operation buttons 14B to 14E are used for, for example, determination operation and cancellation operation. The power button 14F is used for powering the game apparatus 10 on/off.

The analog stick 15 is a device for indicating a direction. The analog stick 15 has a top, corresponding to a key, which slides parallel to the inner side surface of the lower housing 11. The analog stick 15 acts in accordance with a program executed by the game apparatus 10. For example, when a game in which a predetermined object appears in a three-dimensional virtual space is executed by the game apparatus 10, the analog stick 15 acts as an input device for moving the predetermined object in the three-dimensional virtual space. In this case, the predetermined object is moved in a direction in which the top corresponding to the key of the analog stick 15 slides. As the analog stick 15, a component which enables an analog input by being tilted by a predetermined amount, in any direction, such as the upward, the downward, the rightward, the leftward, or the diagonal direction, may be used.

Further, the microphone hole 18 is provided on the inner side surface of the lower housing 11. Under the microphone hole 18, a microphone 42 (see FIG. 3) is provided as a sound input device described below, and the microphone 42 detects for a sound from the outside of the game apparatus 10.

FIG. 2(a) is a left side view of the game apparatus 10 in the closed state. FIG. 2(b) is a front view of the game apparatus 10 in the closed state. FIG. 2(c) is a right side view of the game apparatus 10 in the closed state. FIG. 2(d) is a rear view of the game apparatus 10 in the closed state. As shown in FIGS. 2(h) and 2(d), an L button 14G and an R button 14H are provided on the upper side surface of the lower housing 11 The L button 14G and the R button 14H can act, for example, as shutter buttons (imaging instruction buttons) of the imaging section. Further, as shown in FIG. 2(a), a sound volume button 14I is provided on the left side surface of the lower housing 11. The sound volume button 14I is used for adjusting a sound volume of a speaker of the game apparatus 10.

As shown in FIG. 2(a), a cover section 11C is provided on the left side surface of the lower housing 11 so as to be openable and closable. Inside the cover section 11C, a connector (not shown) is provided for electrically connecting between the game apparatus 10 and an external data storage memory 45. The external data storage memory 45 is detachably connected to the connector. The external data storage memory 45 is used for, for example, recording (storing) data of an image taken by the game apparatus 10.

Further, as shown in FIG. 2(d), an insertion opening 11D through which the external memory 44 having the game program stored therein is inserted is provided on the upper side surface of the lower housing 11. A connector (not shown) for electrically connecting between the game apparatus 10 and the external memory 44 in a detachable manner is provided inside the insertion opening 11D. A predetermined game program is executed by connecting the external memory 44 to the game apparatus 10.

Further, as shown in FIGS. 1 and 2(c), a first LED 16A for notifying a user of an ON/OFF state of a power supply of the game apparatus 10 is provided on the lower side surface of the lower housing 11, and a second LED 16B for notifying a user of an establishment state of a wireless communication of the game apparatus 10 is provided on the right side surface of the lower housing 11. The game apparatus 10 can make wireless communication with other devices, and the second LED 16B is lit up when the wireless communication is established. The game apparatus 10 has a function of connecting to a wireless LAN in a method based on, for example, IEEE802.11.b/g standard. A wireless switch 19 for enabling/disabling the function of the wireless communication is provided on the right side surface of the lower housing 11 (see FIG. 2(c)).

A rechargeable battery (not shown) acting as a power supply for the game apparatus 10 is accommodated in the lower housing 11, and the battery can be charged through a terminal provided on a side surface (for example, the upper side surface) of the lower housing 11.

(Description of Upper Housing)

Next, a structure of the upper housing 21 will be described. As shown in FIGS. 1 and 2, in the upper housing 21, an upper LCD (Liquid Crystal Display) 22, an outer imaging section 23 (an outer imaging section (left) 23a and an outer imaging section (right) 23b), an inner imaging section 24, a 3D adjustment switch 25, and a 3D indicator 26 are provided. Hereinafter, theses components will be described in detail.

As shown in FIG. 1, the upper LCD 22 is accommodated in the upper housing 21. The number of pixels of the upper LCD 22 may be, for example, 800 dots×240 dots (the horizontal line×the vertical line). Although, in the present embodiment, the upper LCD 22 is an LCD, a display device using an EL (Electro Luminescence), or the like may be used. In addition, a display device having any resolution may be used as the upper LCD 22.

The upper LCD 22 is a display device capable of displaying a stereoscopically visible image. Further, in the present embodiment, an image for a left eye and an image for a right eye are displayed by using substantially the same display area. Specifically, the upper LCD 22 may be a display device using a method in which the image for a left eye and the image for a right eye are alternately displayed in the horizontal direction in predetermined units (for example, every other line). Further, in the present embodiment, the upper LCD 22 is a display device capable of displaying an image which is stereoscopically visible with naked eyes. A lenticular lens type display device or a parallax barrier type display device is used which enables the image for a left eye and the image for a right eye, which are alternately displayed in the horizontal direction, to be separately viewed by the left eye and the right eye, respectively. In the present embodiment, the upper LCD 22 of a parallax barrier type is used. The upper LCD 22 displays, by using the image for a right eye and the image for a left eye, an image which is stereoscopically visible with naked eyes. That is, the upper LCD 22 allows a user to view the image for a left eye with her/his left eye, and the image for a right eye with her/his right eye by utilizing a parallax barrier, so that a stereoscopic image (a stereoscopically visible image) exerting a stereoscopic effect for a user can be displayed. Further, the upper LCD 22 may disable the parallax barrier. When the parallax barrier is disabled, an image can be displayed in a planar manner (it is possible to display a planar visible image which is different from a stereoscopically visible image as described above. Specifically, a display mode is used in which the same displayed image is viewed with a left eye and a right eye.). Thus, the upper LCD 22 is a display device capable of switching between a stereoscopic display mode for displaying a stereoscopically visible image and a planar display mode (for displaying a planar visible image) for displaying an image in a planar manner. The switching of the display mode is performed by the 3D adjustment switch 25 described below.

Two imaging sections (23a and 23b) provided on the outer side surface (the back surface reverse of the main surface on which the upper LCD 22 is provided) 21D of the upper housing 21 are generically referred to as the outer imaging section 23. The imaging directions of the outer imaging section (left) 23a and the outer imaging section (right) 23b are each the same as the outward normal direction of the outer side surface 21D.

The outer imaging section (left) 23a and the outer imaging section (right) 23b can be used as a stereo camera depending on a program executed by the game apparatus 10. Each of the outer imaging section (left) 23a and the outer imaging section (right) 23b includes an imaging device, such as a CCD image sensor or a CMOS image sensor, having a common predetermined resolution, and a lens.

The inner imaging section 24 is positioned on the inner side surface (main surface) 21B of the upper housing 21, and acts as an imaging section which has an imaging direction which is the same direction as the inward normal direction of the inner side surface. The inner imaging section 24 includes an imaging device, such as a CCD image sensor and a CMOS image sensor, having a predetermined resolution, and a lens.

The 3D adjustment switch 25 is a slide switch, and is used for switching a display mode of the upper LCD 22 as described above. Further, the 3D adjustment switch 25 is used for adjusting the stereoscopic effect of a stereoscopically visible image (stereoscopic image) which is displayed on the upper LCD 22.

A slider 25a of the 3D adjustment switch 25 is slidable to any position in a predetermined direction (along the longitudinal direction of the right side surface), and a display mode of the upper LCD 22 is determined in accordance with the position of the slider 25a. Further, a manner in which the stereoscopic image is visible is adjusted in accordance with the position of the slider 25a. Specifically, an amount of deviation in the horizontal direction between a position of an image for a right eye and a position of an image for a left eye is adjusted in accordance with the position of the slider 25a.

The 3D indicator 26 indicates whether or not the upper LCD 22 is in the stereoscopic display mode. The 3D indicator 26 is implemented as a LED, and is lit up when the stereoscopic display mode of the upper LCD 22 is enabled. The 3D indicator 26 may be configured to be lit up only when the upper LCD 22 is in the stereoscopic display mode and program processing for displaying a stereoscopic image is performed.

Further, a speaker hole 21E is provided on the inner side surface of the upper housing 21. A sound is outputted through the speaker hole 21E from a speaker 43 described below.

(Internal Configuration of Game Apparatus 10)

Figure 3:
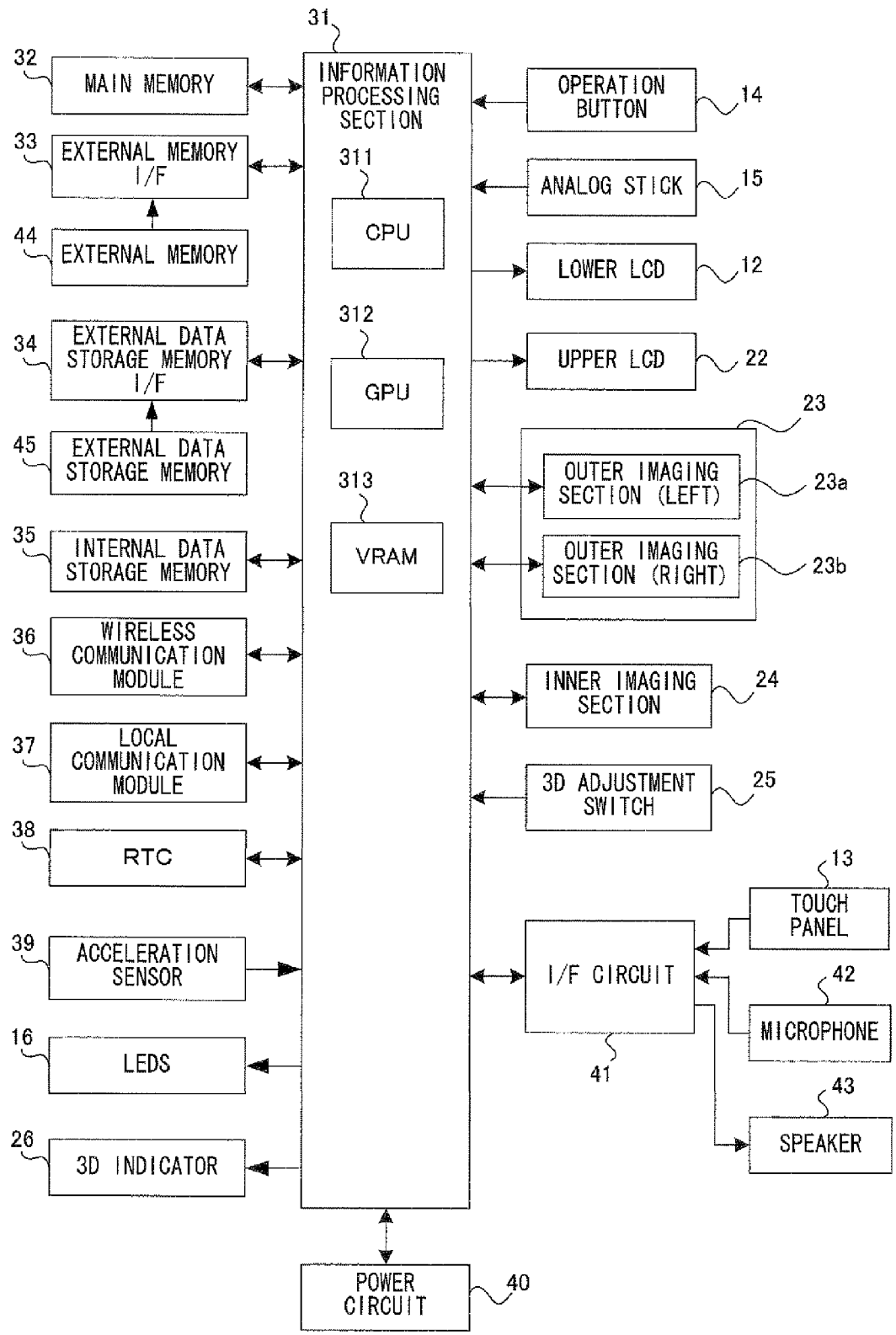
FIG. 3 is a block diagram illustrating an internal configuration of the game apparatus 10.

Next, an internal electrical configuration of the game apparatus 10 will be described with reference to FIG. 3. FIG. 3 is a block diagram illustrating an internal configuration of the game apparatus 10. As shown in FIG. 3, the game apparatus 10 includes, in addition to the components described above, electronic components such as an information processing section 31, a main memory 32, an external memory interface (external memory I/F) 33, an external data storage memory I/F 34, the internal data storage memory 35, a wireless communication module 36, a local communication module 37, a real-time clock (RTC) 38, an acceleration sensor 39, a power supply circuit 40, an interface circuit (I/F circuit) 41, and the like. These electronic components are mounted on an electronic circuit substrate, and accommodated in the lower housing 11 (or the upper housing 21).

The information processing section 31 is information processing means which includes a CPU (Central Processing Unit) 311 for executing a predetermined program, a GPU (Graphics Processing Unit) 312 for performing image processing, and the like. The CPU 311 of the information processing section 31 executes a program stored in a memory (for example, the external memory 44 connected to the external memory I/F 33 or the internal data storage memory 35) inside the game apparatus 10, thereby performing processing corresponding to the program (e.g., photographing processing and below-described game processing). The program executed by the CPU 311 of the information processing section 31 may be obtained from another device through communication with the other device. The information processing section 31 further includes a VRAM (Video RAM) 313. The GPU 312 of the information processing section 31 generates an image in accordance with an instruction from the CPU 311, and renders the image in the VRAM 313. The GPU 312 outputs the image rendered in the VRAM 313, to the upper LCD 22 and/or the lower LCD 12, and the image is displayed on the upper LCD 22 and/or the lower LCD 12.

To the information processing section 31, the main memory 32, the external memory I/F 33, the external data storage memory I/F 34, and the internal data storage memory 35 are connected. The external memory I/F 33 is an interface for detachably connecting to the external memory 44. The external data storage memory I/F 34 is an interface for detachably connecting to the external data storage memory 45.

The main memory 32 is volatile storage means used as a work area and a buffer area for (the CPU 311 of) the information processing section 31. That is, the main memory 32 temporarily stores various types of data used for the processing based on the above program, and temporarily stores a program obtained from the outside (the external memory 44, another device, or the like), for example. In the present embodiment, for example, a PSRAM (Pseudo-SRAM) is used as the main memory 32.

The external memory 44 is nonvolatile storage means for storing a program executed by the information processing section 31. The external memory 44 is implemented as, for example, a read-only semiconductor memory. When the external memory 44 is connected to the external memory I/F 33, the information processing section 31 can load a program stored in the external memory 44. A predetermined process is performed by the program loaded by the information processing section 31 being executed. The external data storage memory 45 is implemented as a non-volatile readable and writable memory (for example, a NAND flash memory), and is used for storing predetermined data. For example, images taken by the outer imaging section 23 and/or images taken by another device are stored in the external data storage memory 45. When the external data storage memory 45 is connected to the external data storage memory I/F 34, the information processing section 31 loads an image stored in the external data storage memory 45, and the image can be displayed on the upper LCD 22 and/or the lower LCD 12.

The internal data storage memory 35 is implemented as a non-volatile readable and writable memory (for example, a NAND flash memory), and is used for storing predetermined data. For example, data and/or programs downloaded through the wireless communication module 36 by wireless communication is stored in the internal data storage memory 35.

The wireless communication module 36 has a function of connecting to a wireless LAN by using a method based on, for example, IEEE 802.11.b/g standard. The local communication module 37 has a function of performing wireless communication with the same type of game apparatus in a predetermined communication method (for example, infrared communication). The wireless communication module 36 and the local communication module 37 are connected to the information processing section 31. The information processing section 31 can perform data transmission to and data reception from another device via the Internet by using the wireless communication module 36, and can perform data transmission to and data reception from the same type of another game apparatus by using the local communication module 37.

The acceleration sensor 39 is connected to the information processing section 31. The acceleration sensor 39 detects magnitudes of accelerations (linear accelerations) in the directions of the straight lines along the three axial (xyz axial) directions, respectively. The acceleration sensor 39 is provided inside the lower housing 11. In the acceleration sensor 39, as shown in FIG. 1, the long side direction of the lower housing 11 is defined as x axial direction, the short side direction of the lower housing 11 is defined as y axial direction, and the direction orthogonal to the inner side surface (main surface) of the lower housing 11 is defined as z axial direction, thereby detecting magnitudes of the linear accelerations for the respective axes. The acceleration sensor 39 is, for example, an electrostatic capacitance type acceleration sensor. However, another type of acceleration sensor may be used. The acceleration sensor 39 may be an acceleration sensor for detecting a magnitude of an acceleration for one axial direction or two-axial directions. The information processing section 31 can receive data (acceleration data) representing accelerations detected by the acceleration sensor 39, and detect an orientation and a motion of the game apparatus 10.

The RTC 38 and the power supply circuit 40 are connected to the information processing section 31. The RTC 38 counts time, and outputs the time to the information processing section 31. The information processing section 31 calculates a current time (date) based on the time counted by the RTC 38. The power supply circuit 40 controls power from the power supply (the rechargeable battery accommodated in the lower housing 11 as described above) of the game apparatus 10, and supplies power to each component of the game apparatus 10.

The I/F circuit 41 is connected to the information processing section 31. The microphone 42 and the speaker 43 are connected to the I/F circuit 41. Specifically, the speaker 43 is connected to the I/F circuit 41 through an amplifier which is not shown. The microphone 42 detects a voice from a user, and outputs a sound signal to the I/F circuit 41. The amplifier amplifies a sound signal outputted from the I/F circuit 41, and a sound is outputted from the speaker 43.

The touch panel 13 is connected to the I/F circuit 41. The I/F circuit 41 includes a sound control circuit for controlling the microphone 42 and the speaker 43 (amplifier), and a touch panel control circuit for controlling the touch panel.

The sound control circuit performs A/D conversion and D/A conversion on the sound signal, and converts the sound signal to a predetermined form of sound data, for example. The touch panel control circuit generates a predetermined form of touch position data based on a signal outputted from the touch panel 13, and outputs the touch position data to the information processing section 31.

The touch position data represents a coordinate of a position, on an input surface of the touch panel 13, on which an input is made. The touch panel control circuit reads a signal outputted from the touch panel 13, and generates the touch position data every predetermined time. The information processing section 31 obtains the touch position data, to recognize a position on which an input is made on the touch panel 13.

The operation button 14 includes the operation buttons 14A to 14L described above, and is connected to the information processing section 31. Operation data representing an input state of each of the operation buttons 14A to 14I is outputted from the operation button 14 to the information processing section 31, and the input state indicates whether or not each of the operation buttons 14A to 14I has been pressed. The information processing section 31 obtains the operation data from the operation button 14 to perform a process in accordance with the input on the operation button 14.

The lower LCD 12 and the upper LCD 22 are connected to the information processing section 31. The lower LCD 12 and the upper LCD 22 each display an image in accordance with an instruction from (the GPU 312 of) the information processing section 31. In the present embodiment, the information processing section 31 causes the upper LCD 12 to display a stereoscopic image (stereoscopically visible image).

Specifically, the information processing section 31 is connected to an LCD controller (not shown) of the upper LCD 22, and causes the LCD controller to set the parallax barrier to ON or OFF. When the parallax barrier is set to ON in the upper LCD 22, an image for a right eye and an image for a left eye which are stored in the VRAM 313 of the information processing section 31 are outputted to the upper LCD 22. More specifically, the LCD controller alternately repeats reading of pixel data of the image for a right eye for one line in the vertical direction, and reading of pixel data of the image for a left eye for one line in the vertical direction, thereby reading, from the VRAM 313, the image for a right eye and the image for a left eye. Thus, an image to be displayed is divided into the images for a right eye and the images for a left eye each of which is a rectangle-shaped image having one line of pixels aligned in the vertical direction, and an image, in which the rectangle-shaped image for the left eye which is obtained through the division, and the rectangle-shaped image for the right eye which is obtained through the division are alternately aligned, is displayed on the screen of the upper LCD 22. A user views the images through the parallax barrier in the upper LCD 22, so that the image for the right eye is viewed by the user's right eye, and the image for the left eye is viewed by the user's left eye. Thus, the stereoscopically visible image is displayed on the screen of the upper LCD 22.

The outer imaging section 23 and the inner imaging section 24 are connected to the information processing section 31. The outer imaging section 23 and the inner imaging section 24 each take an image of the real world in accordance with an instruction from the information processing section 31 and output image data of the real world to the information processing section 31. When a taken image is displayed in real time on the upper LCD 22 or the lower LCD 12 or when image processing such as color recognition or face recognition is performed, each of the outer imaging section 23 and the inner imaging section 24 is configured to take an image of the real world at predetermined time intervals and output the image date to the information processing section 31.

The 3D adjustment switch 25 is connected to the information processing section 31. The 3D adjustment switch 25 transmits, to the information processing section 31, an electrical signal in accordance with the position of the slider 25*a*.

The 3D indicator 26 is connected to the information processing section 31. The information processing section 31 controls whether or not the 3D indicator 26 is to be lit up. For example, the information processing section 31 lights up the 3D indicator 26 when the upper LCD 22 is in the stereoscopic display mode. The game apparatus 10 has the internal configuration as described above.

(One Example of Web Browser Application Included in Game Apparatus 10)

The game apparatus 10 has a web browser application 71 (hereinafter, referred to as web browser 71). The web browser 71 has, as basic functions, for example, functions of an HTTP user agent, a parser, and a renderer. The HTTP user agent is a program that communicates with a web server on the basis of URI•HTTP or the like to obtain a content. The parser is a program that performs parsing in accordance with the obtained content (text, image, HTML, XHTML, XML, or the like). The renderer is a program that shows a user the content in an appropriate form on the basis of a result of the parsing by the parser. For example, the renderer shows the user the content in a form in which an image and a text are arranged on a display screen on the basis of a predetermined arrangement.

Specifically, for example, the web browser 71 can be one conforming to, for example, OMA Browsing 2.3 standards as supporting standards. In addition, examples of a protocol included in the web browser 71 include, but are not limited to, HTTP 1.0/1.1, WAP, IPv4/IPv6, and Dual TCP/IP.

Further, examples of a script included in the web browser 71 include, but are not limited to, ECMAScript 262 3rd Edition, ECMAScript Mobile Profile, WMLScript, DOM Level 1, Level 2, Dynamic HTML, and Ajax (XMLHttpRequest).

Examples of a markup included in the web browser 71 include, but are not limited to, cHTML, HTML5, HTML 4.01, XHTML1.1, XHTML Mobile Profile 1.2, WML 1.3, and SMIL 2.1 (RSS 0.9/0.91/0.92/1.0/2.0, Atom 0.3/1.0).

Examples of a style sheet included in the web browser 71 include, but are not limited to, CSS1, CSS2.1, CSS3, and CSS MP1.1.

(Outline of Information Processing in Game Apparatus 10)
(Input Operation Such as Scrolling Operation on Web Page A0)

Figure 4:
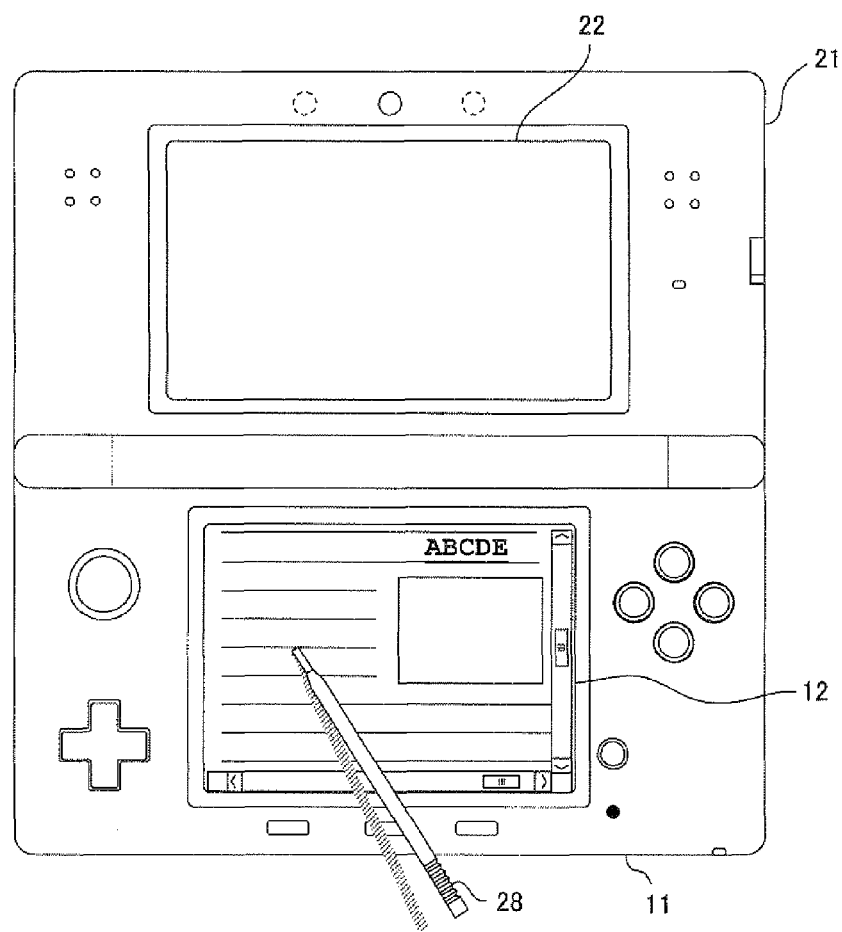
FIG. 4 is a schematic diagram illustrating a situation where the game apparatus 10 loads an exemplified web page and displays the web page on a display region of a lower LCD 12.

FIG. 4 is a schematic diagram illustrating a situation where the game apparatus 10 loads an exemplified web page and displays the web page on a display region of the lower LCD 12.

Specifically, the web browser 71 (see FIG. 9 described below) executed in the game apparatus 10 loads a web page, and displays a part of the web page on the lower LCD 12. The user of the game apparatus 10 can perform an input operation on the touch panel 13 mounted on the screen of the lower LCD 12, to change the display form of the loaded web page. In other words, while viewing the displayed web page, the user can perform an input operation with the touch pen 28 on the touch panel 13 mounted on the screen of the lower LCD 12, to change the display form of the web page.

FIG. 4 schematically illustrates a display form in which a part of the web page is displayed on the substantially entire display region of the lower LCD 12. However, the illustrated display form is merely an example for simply describing the exemplified embodiment of the present invention.

In other words, the game apparatus 10 does not necessarily take the display form in which only a part of the web page that is display object data is displayed on the substantially entire display region of the lower LCD 12. In reality, the game apparatus 10 can simultaneously display, on the display region of the lower LCD 12, not only visualized data corresponding to display object data in this process (the web page in the above example) but also visualized data required for other processes, such as a predetermined graphical user interface (GUI). For example, when displaying a web page on the lower LCD 12, the game apparatus 10 can secure a part of the lowermost portion of the lower LCD 12 as a display region for a tool bar (a kind of GUI) that is operable by the user.

In the following, a display control process performed when the game apparatus 10 displays predetermined display object data on the display region of the lower LCD 12 will mainly be described. Since handling of the display object data in the display control process will mainly be described, a specific description concerning the above GUI (or a third content that is to be displayed on the display region of the lower LCD 12) and the like is omitted for simplification of explanation. Therefore, hereinafter, when the display object data is displayed on the display region of the lower LCD 12, the display object data is not necessarily intended to be displayed on the entire display region of the lower LCD 12, but is intended to be displayed by the game apparatus 10 in a predetermined range in the display region of the lower LCD 12 in accordance with a predetermined setting of the display control process.

Figure 5:
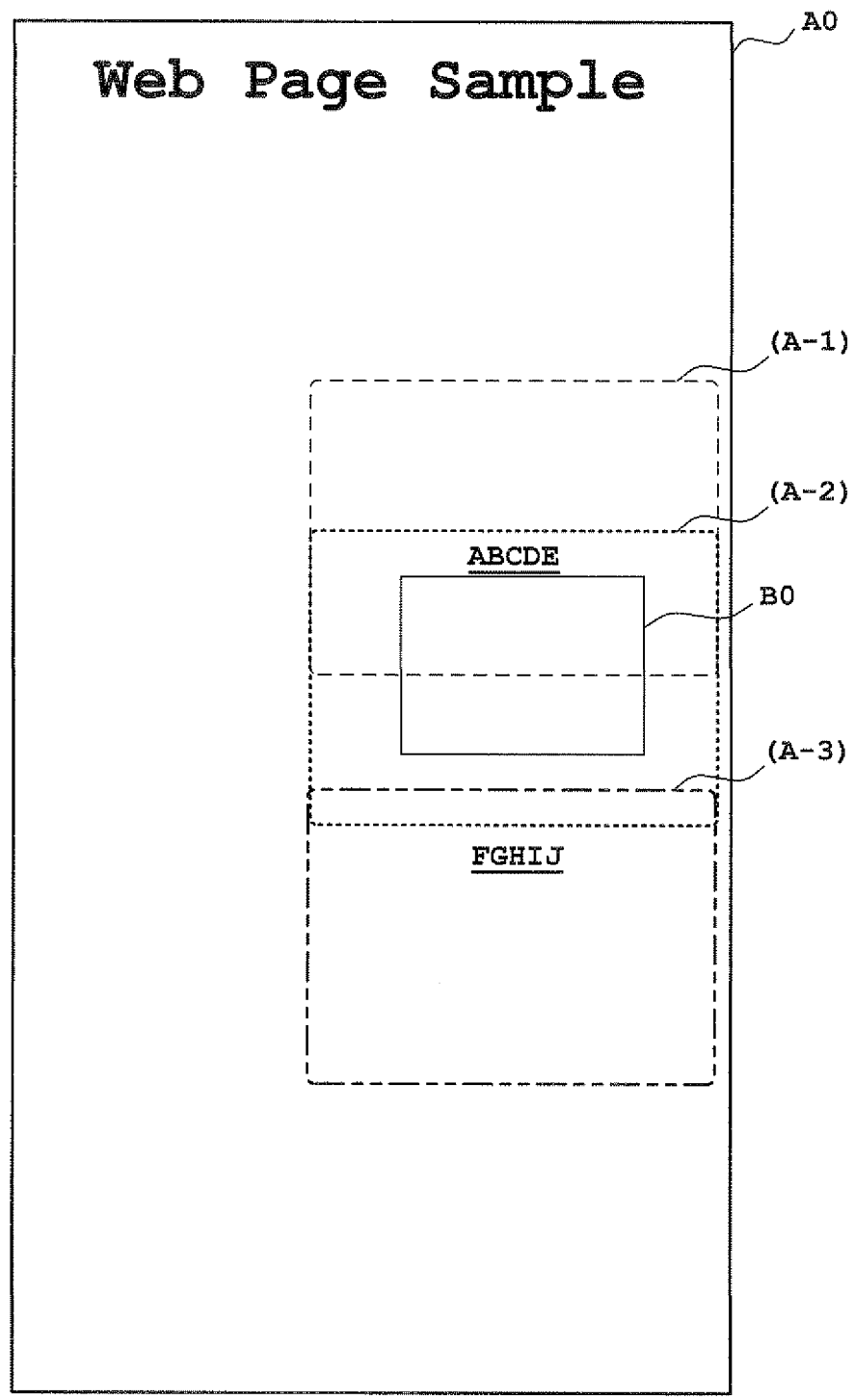
FIG. 5 is a schematic diagram illustrating an example of the web page loaded by the game apparatus 10.

FIG. 5 is a schematic diagram illustrating an example of the web page loaded by the game apparatus 10. The web page A0 can be created, for example, as an HTML document. In the web page A0, the display form of the document is controlled with a style sheet (e.g., CSS (Cascading Style Sheets)) or the like. In the exemplified embodiment, the web page A0 has a subregion B0 substantially at the center of the right side (between a character string "ABCDE" and a character string "FGHIJ"). The subregion B0 is defined as a region in which a predetermined content (e.g., an image for map) is to be displayed.

In the exemplified embodiment, a part of a predetermined content (hereinafter, referred to as content C0) is displayed in the subregion B0.

When the web page A0 is displayed on the lower LCD 12, the user can recognize that a part of the web page A0 is displayed on the lower LCD 12, through a scroll bar displayed on the right side of the display region as illustrated in FIG. 4. Meanwhile, although details will be described below, the part of the above content C0 that is displayed in the subregion B0 can be changed under a predetermined condition.

The user can change the part of the web page A0 that is displayed on the lower LCD 12, on the basis of a scrolling function implemented by the web browser 71 and other related programs included in the game apparatus 10, whereby the user can view the entirety of the web page A0 through the display region of the lower LCD 12.

One example of a scrolling operation is a so-called drag operation. When a part of a content (the web page A0 in the present embodiment) is displayed on a screen having a touch panel (the lower LCD 12 in the present embodiment), if a touch-on is performed with the touch pen 28 on the touch panel 13 and the touch pen 28 is slid in a predetermined direction, for example, from left to right, with the touch-on maintained, the displayed content can be scrolled rightward. Thus, a desired part of the content can be moved to be within the display screen (display region).

In the present embodiment, the drag operation has been described as a example of the scrolling operation. However, a flick operation (an operation of performing a touch-on, moving a finger or the touch pen so as to lightly swipe the screen, and performing a touch-off; in other words, performing a touch-on and then an operation so as to flick) is also possible for scrolling a content. As a result, a scrolling operation having inertia corresponding to the strength of the flick operation is performed. When such a flick operation is performed, scrolling continues for a short time even after the touch-off, due to the inertia force based on the strength of the flick operation.

Figure 6:
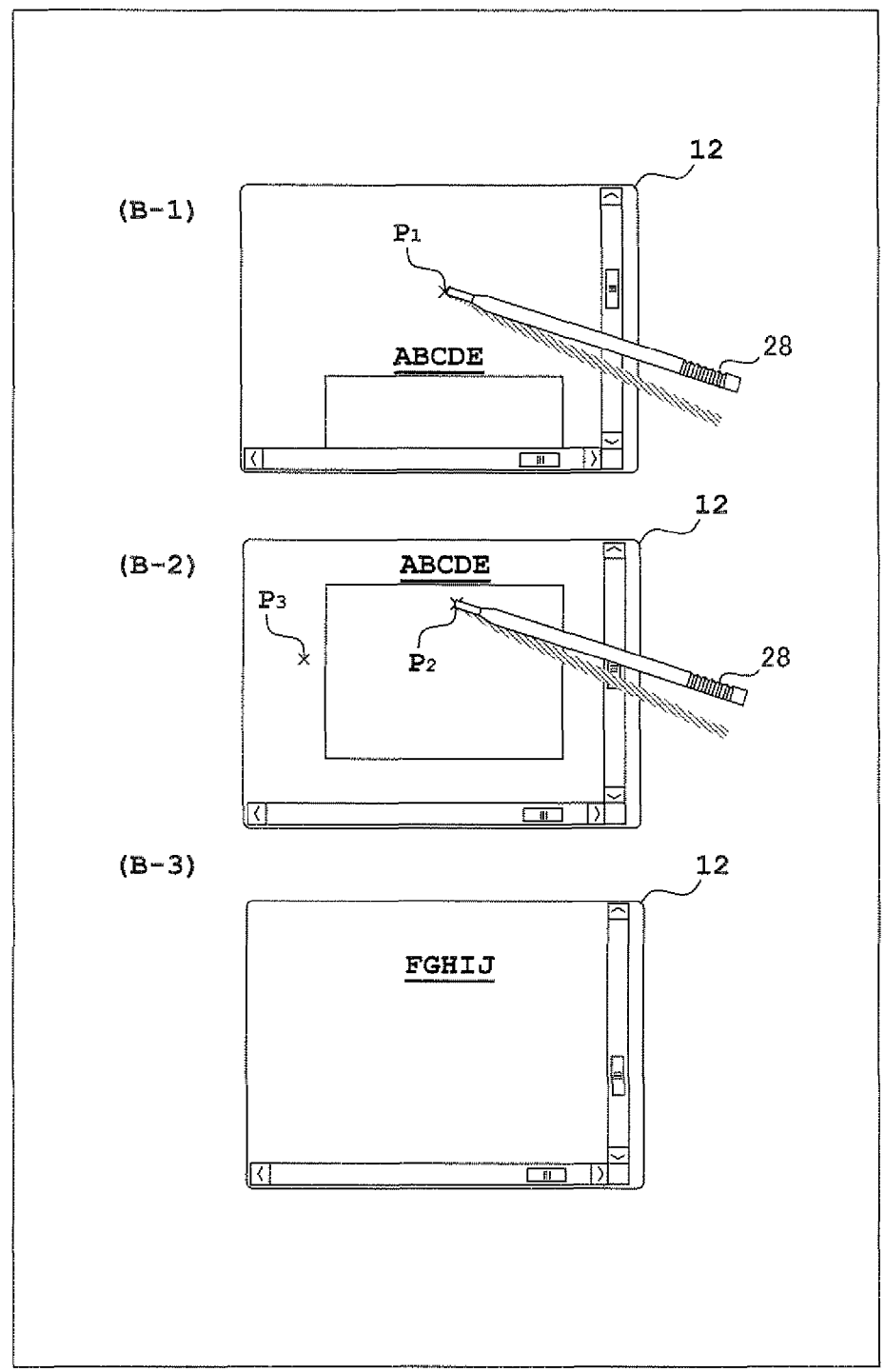
FIG. 6 is a schematic diagram illustrating a situation where exemplified subregions (A-1), (A-2), and (A-3) of a web page A0 shown in FIG. 5 are displayed on the display region of the lower LCD 12.

With reference to FIG. 6 and the subsequent drawings, the example of the scrolling operation on the web page A0 will be described in more detail. FIG. 6 is a schematic diagram illustrating a situation where exemplified subregions (A-1), (A-2), and (A-3) of the web page A0 shown in FIG. 5 are displayed on the display region of the lower LCD 12. In FIG. 5, the subregions (A-1), (A-2), and (A-3) are indicated by different types of lines. (B-1), (B-2), and (B-3) of FIG. 6 are schematic diagrams illustrating only the display regions when the subregions (A-1), (A-2), and (A-3) are displayed on the lower LCD 12, respectively.

In the state indicated in (B-1) of FIG. 6, the subregion B0 of the web page A0 is only partially displayed on the lower LCD 12. In the state indicated in (B-1) of FIG. 6, for example, the user touches a point P1 on the lower LCD 12 with the touch pen 28 and performs a drag operation from the point P1 along the display surface of the lower LCD 12 toward the upper side (toward the upper LCD 22), whereby the web page A0 can be displayed in a form in which the subregion B0 is fully displayed (e.g., in the state of (B-2)).

In the state indicated in (B-2) of FIG. 6, the subregion B0 of the web page A0 is displayed substantially at the center of the lower LCD 12. In the present embodiment, similarly to the above case where the drag operation is performed from the point P1 in the state of (B-1), the user performs a drag operation from a point P2 in the state of (B-2) along the display surface of the lower LCD 12 toward the upper side (toward the upper LCD 22 of the game apparatus 10 in the opened state), whereby the displayed range of the web page A0 can be changed to a state where the subregion B0 of the web page A0 is not displayed (e.g., the state indicated by (B-3)).

In the state indicated by (B-2), the point P2 is located within the subregion B0. As described above, a part of the content C0 is displayed in the subregion B0. In the present embodiment, even when the user performs a single touch operation with the touch pen 28 on a position (e.g., the point P2) within the subregion B0 on the touch panel 13, the display form of the content C0 displayed in the subregion B0 is not changed. In order to cause the game apparatus 10 to determine that an operation on a position (e.g., the point P2) within the subregion B0 is an operation for changing the displayed part of the content C0, the user needs to perform a predetermined operation (e.g., a long pressing operation or a double click operation) on the touch panel 13.

(Example of Process when Predetermined Operation Such as Long Pressing Operation is Performed)

A predetermined operation (e.g., a long pressing operation or a double click operation) on the touch panel 13 for shifting to a state where an operation on the point P2 within the subregion B0 is handled as an operation for changing the displayed part of the content C0 (an operation mode), will be described with reference to FIG. 7.

Figure 7:
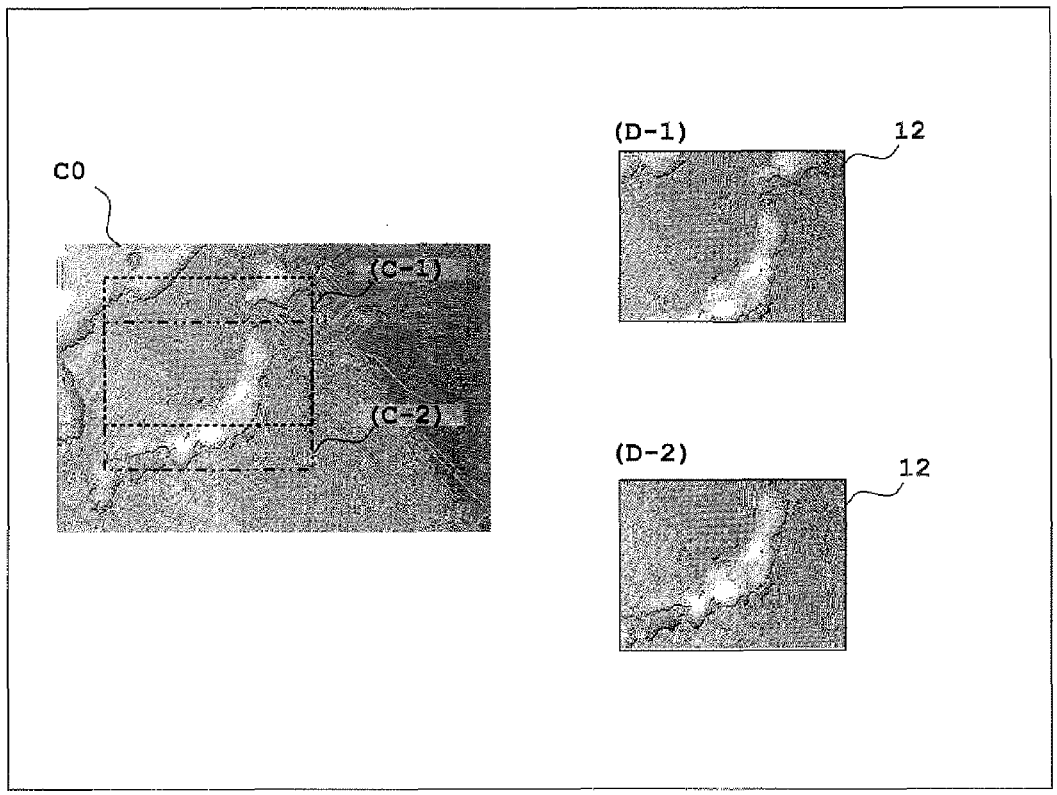
FIG. 7 is a schematic diagram illustrating an example of a content C0 and its subregions.

FIG. 7 is a schematic diagram illustrating an example of the content C0 and its subregions. On the left side of FIG. 7, an example of an image representing a map (hereinafter, referred to map image C0) is shown as an example of the content C0. On the right side of FIG. 7, examples of image diagrams (D-1) and (D-2) provided when subregions (C-1) and (C-2) of the map image C0 shown on the left side are displayed on the display region of the lower LCD 12 are shown. In FIG. 7, the subregions (C-1) and (C-2) are indicated by different types of lines.

For example, when the user performs a predetermined operation (a long pressing operation, a double click operation, or the like) on a point within the subregion B0 while viewing the web page A0 on the lower LCD 12 in the state in (B-2) of FIG. 6 (details of the image of the content C0 are omitted in (B-2) of FIG. 5), the game apparatus 10 determines that the user has selected a process for scrolling the map image C0 instead of a process for scrolling the whole web page A0.

When determining so, the game apparatus 10 determines an input provided within the subregion B0 (a touch operation, a drag operation, or the like with the touch pen 28) as being a request to change the displayed part of the map image C0 within the subregion B0. For example, under this condition, the user performs a drag operation from the point P2 in (B-2) along the display surface of the lower LCD 12 toward the upper side (toward the upper LCD 22), to change the part of the map image C0 displayed in the subregion B0 (e.g., to change continuously from (D-1) to (D-2)). In a typical case, even when the user stops an input operation (performs a touch-off) after the user selects a process for scrolling the map image C0, if the user performs a drag operation from a point within the subregion again, the game apparatus 10 changes the part of the map image C0 that is displayed in the subregion B0.

In the above example, the user switches the operable content (from the entire web page A0 including the subregion B0 to the content C0 within the subregion B0) by the predetermined operation such as a long pressing operation. Settings may be made such that when another set predetermined operation (e.g., a touch operation on a point (e.g., a point P3 in FIG. 7) within a region other than the subregion B0 after a long pressing operation) is performed, the state is returned to the original state (a state where the entire web page A0 is operable). Examples of the additional input operation that serves as a trigger for performing the above return process include, but are not limited to, an operation of re-touching a position within a region other than the subregion B0 after the user performs a touch-off.

Figure 8:
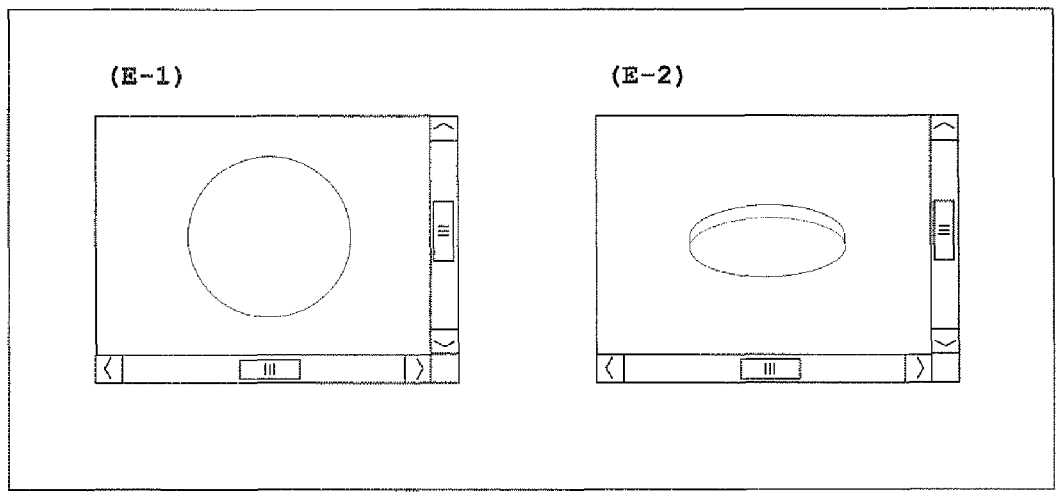
FIG. 8 is a schematic diagram illustrating an example of a three-dimensional virtual object that can be displayed in a subregion 130.

Further, the content C0 is an image in the example of FIG. 7, but may not necessarily be an image. For example, the content C0 may be a text of which the entirety cannot be displayed in the subregion B0 at one time. In addition, the content C0 may be a three-dimensional object as shown in an example of FIG. 8. FIG. 8 is a schematic diagram illustrating an example of a three-dimensional virtual object that can be displayed in the subregion B0. In (E-1) of FIG. 8, the content displayed on the lower LCD 12 is a three-dimensional virtual object having a coin shape. Here, the three-dimensional virtual object is displayed such that a main surface thereof faces the front. After the operation mode is switched by a long pressing operation on the subregion B0, the user can perform a drag operation from a point within the subregion B0 to change the display form of the virtual object from the orientation illustrated in (E-1) to an orientation illustrated in (E-2).

In other words, the example where a drag operation is related to a two-dimensional positional relation of the map image C0 is described in the cases indicated in (D-1) and (D-2) as shown in FIG. 7, but (E-1) and (E-2) illustrate an example where a drag operation is related to the orientation of the three-dimensional object.

(One Example of Effect Provided in Exemplified Embodiment)

According to the configuration described above, the user can enjoy improved usability as compared to the conventional art. While a part of the web page A0 is displayed so as to be viewable by the user, the user sequentially changes the viewable part of the web page A0 (e.g., the states illustrated in (B-1), (B-2), and (B-3) of FIG. 6 are displayed on the lower LCD 12 in order). In this process, an operation can be established that is an operation for, even when the user touches a point (e.g., the point P2) within the subregion B0, displaying the web page A0 while moving the entire web page A0 in a desired direction, as desired, without changing the display form of the content C0 displayed within the subregion B0. Meanwhile, when changing the display form of the content C0 displayed in the subregion B0, the user can assuredly perform a operation for changing the display form after performing a predetermined operation.

(Details of Exemplified Process)

Hereinafter, a flow of a process performed on the basis of an information processing program according to the exemplified embodiment of the present invention will be described with reference to flowcharts in the appended drawings. In the appended drawings, "step" is abbreviated to "S". It should be noted that the flowcharts in the appended drawings are merely examples of a processing procedure. Therefore, the order of each process step may be changed as long as the same result is obtained. In addition, the values of variables and thresholds used at determination steps are also merely examples, and other values may be used as necessary.

Hereinafter, an example of a specific process of a display control program that is to be performed by the game apparatus 10 according to the exemplified embodiment of the present invention will be described with reference to the appended drawings.

(Example of Main Data Used in Process)

First, main data stored in the main memory 32 during execution of a display control program 70 according to the present embodiment will be described.

Figure 9:
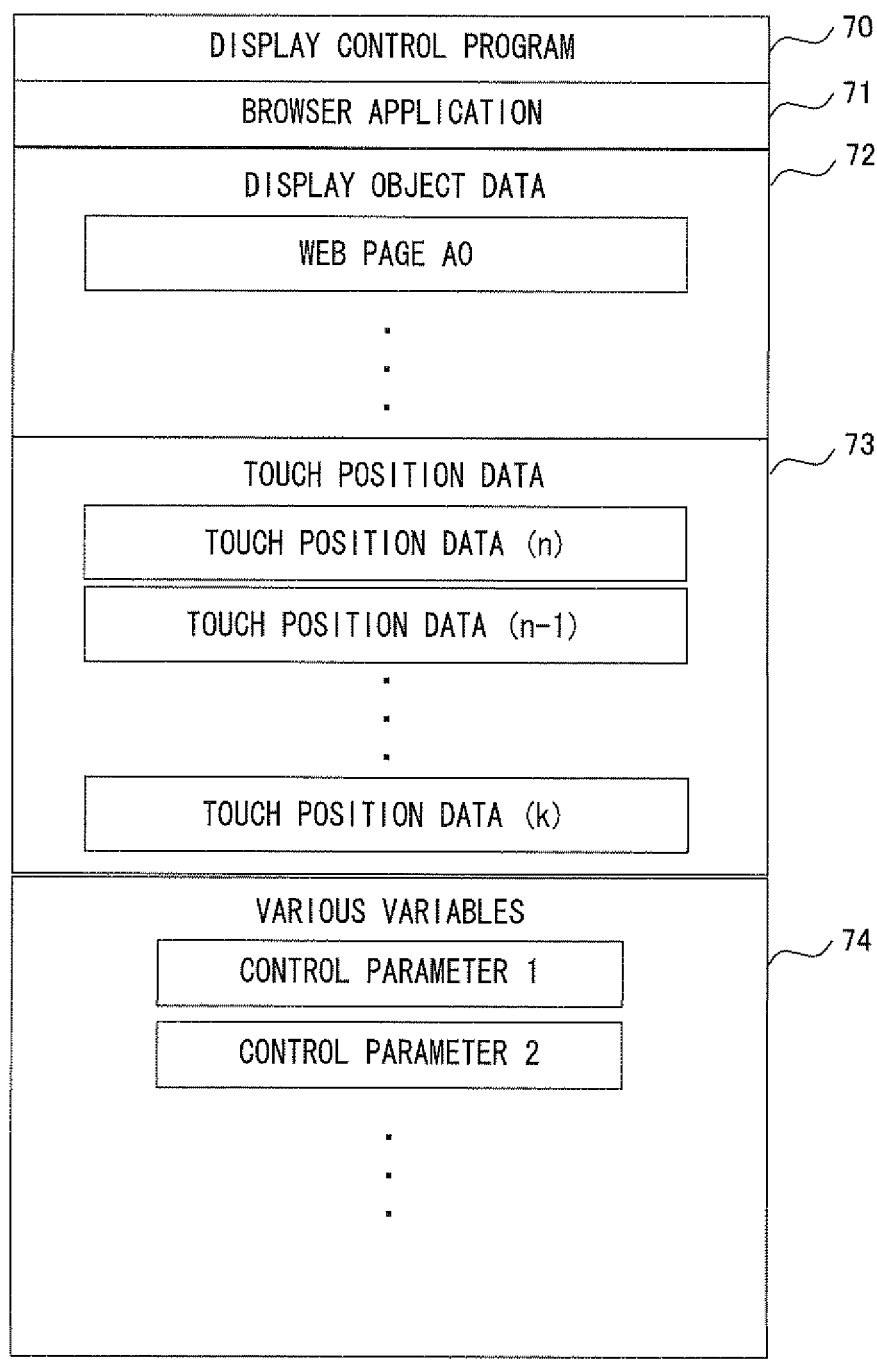
FIG. 9 is a diagram illustrating a memory map of a main memory 32 of the game apparatus 10.

FIG. 9 is a diagram illustrating a memory map of the main memory 32 of the game apparatus 10. As shown in FIG. 9, the display control program 70, the web browser 71, display object data 72, touch position data 73, various variables 74, and the like are stored in the main memory 32. The various variables include parameters appearing during processing of the above display control program, or temporary processing target data. Unless otherwise specified herein, each parameter is stored in the main memory 32 of the game apparatus 10 and can be reused. Alternatively, data indicating these parameters and the like may be stored in another storage area of the game apparatus 10 and may be reused by being read therefrom.

The display control program 70 is a program for displaying a content on the display device (mainly, the lower LCD 12).

The web browser 71 is a web browser application included in the game apparatus 10. The function and the like of the web browser 71 are as described above.

The display object data 72 is a set of data stored in the game apparatus 10 as objects to be displayed on the display device (e.g., the lower LCD 12) of the game apparatus 10. The display object data 72 includes data of the web page A0.

The touch position data 73 represents a coordinate (X, Y) of a position on which an input is performed on the input surface of the touch panel 13. Touch position data (n) that is a current processing target and temporally previous touch position data (touch position data (n-1) and the like) that is used in a process of analyzing the touch position data (n) are described.

The various variables 74 include control parameters used when the display control program or the like is executed.

(Process in Game Apparatus 10)

Figure 10:
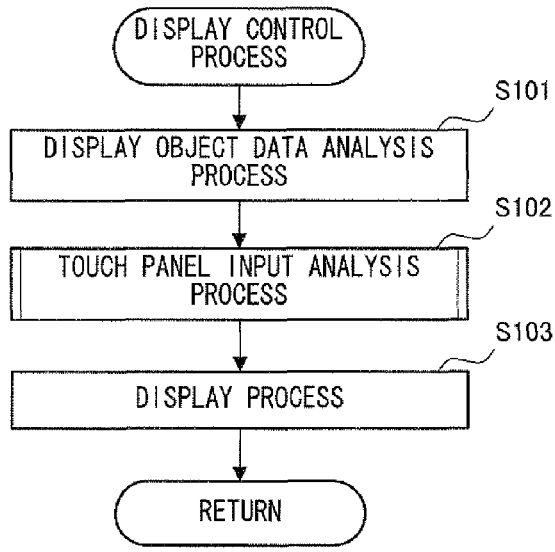
FIG. 10 is a flowchart illustrating an example of a display control process.

FIG. 10 is a flowchart illustrating an example of a display control process performed in the game apparatus 10 according to the exemplified embodiment of the present invention on the basis of the display control program 70.

Hereinafter, a process in which the web browser 71 included in the game apparatus 10 loads the web page A0 and the display control program 70 displays the content on the lower LCD 12 in accordance with its control settings, will be described as an example.

The process described below includes a process performed by the display control program 70 in cooperation with another program including the web browser 71, but for simplification of explanation, it will be described here representatively as a process of the display control program 70. One skilled in the art can understand the concepts of the present invention on the basis of the description of the present specification concerning an exemplified embodiment below, as appropriate.

Further, for simplification of explanation, each of processes described below is performed by the CPU 311. However, none of the processes is limited to be performed by the CPU 311, and these processes may be performed by another processor as necessary, or may be distributed and performed as necessary.

Processes performed on the basis of the display control program 70 are generally the following processes as shown in FIG. 10. It should be noted that the CPU 311 performs an initialization process on each parameter and the like as appropriate, but the description thereof is omitted in the following flowchart for simplification of explanation.

At step 101, the CPU 311 performs a display object data analysis process.

At step 102, the CPU 311 performs a touch panel input analysis process.

At step 103, the CPU 311 performs rendering (a display process) of a content (resource) on the basis of a result of the display object data analysis process and a result of the touch panel input analysis process, for displaying the content on the display device (the upper LCD 22 in the present embodiment).

In the game apparatus 10, in accordance with settings of a program executed there, predetermined contents are consecutively generated and displayed on the display device (e.g., the lower LCD 12). The processes at steps 101 to 103 are performed per unit (frame) of the continuous display process performed in the game apparatus 10 (or per predetermined number of frames). These processes will be described in order.

At step 101, the CPU 311 performs the display object data analysis process.

The CPU 311 obtains, for example, the display object data 72 that is to be a display object obtained on the basis of the function of the web browser 71. In the present embodiment, the display object data 72 is data corresponding to the web page A0. Specifically, the web page A0 can be created, for example, as an HTML document. In the web page A0, the display form of the document is controlled with a style sheet (e.g., CSS (Cascading Style Sheets)) or the like.

The CPU 311 analyzes how the obtained display object data 72 is to be displayed on the display device (lower LCD 12), by using the function of the web browser 71 and the like. In the present embodiment, the web page A0 schematically illustrated in FIG. 5 is an object to be displayed on the display device. The CPU 311 displays a part of the web page A0 on the lower LCD 12, for example, in the form as shown in FIG. 4.

Here, the displayed part and display form of the web page A0 are set on the basis of input information from the user that is obtained at step 102 and the subsequent steps. While continuously displaying the content, the CPU 311 receives an input from an input device (e.g., the touch panel 13) and performs a process of updating the content substantially in real time in accordance with the input information. Thus, the CPU 311 performs a process of displaying, on the lower LCD 12 at appropriate timing, a content viewed by the user through the display device (lower LCD 12), an input operation performed on the content, and a content resulting from changing the content in accordance with the input operation (rendering is performed at below-described step 103). Specifically, the processes at steps 101 to 103 are performed at appropriate timing (particularly, process of frame) that allows a real time process that does not provide a sense of discomfort to the user of the game apparatus 10 to be established.

At step 102, the CPU 311 performs the touch panel input analysis process. Specifically, the CPU 311 detects and analyzes an input operation performed by the user on the touch panel 13.

The touch panel 13 is a resistive film type. Metallic thin films that form transparent electrodes of the touch panel 13 have resistances, and a voltage is applied to one of the two facing resistive films. A voltage corresponding to a position on which the user performs an operation occurs at the other resistive film and is detected as an analogue amount, to obtain information of the position on which the user performs the operation. Therefore, a touch position on the touch panel 13 corresponding to a position on the lower LCD 12 is analyzed to recognize what operation is performed by the user on a content (e.g., the above web page A0) displayed on the lower LCD 12.

The touch panel control circuit performs reading of a signal from the touch panel 13 and generation of the touch position data 73 every predetermined time (e.g., $\frac{1}{200}$ seconds). The CPU 311 obtains touch position data through the touch panel control circuit to recognize a position on which an input is made on the touch panel 13. The information corresponding to the input operation performed on the touch panel 13 is stored as the touch position data 73. The touch position data 73 represents an coordinate (X, Y) on the input surface of the touch panel 13 on which the input operation is performed. When no input is made on the input surface, nothing is inputted as a coordinate at that time, or predetermined values are inputted in the touch position data 73 and is referred to as necessary, whereby the CPU 311 can determine whether or not an input is made on the touch panel 13 in a processing target frame or can obtain the coordinate data as necessary. It should be noted that time intervals for obtaining touch position data are constant as described above, or even when the time intervals are not constant, if the time intervals are recorded, coordinates of touch position data of any two points and the time interval at which the touch position data is obtained can be calculated. Thus, it is possible to calculate the velocity and acceleration of a predetermined operation performed by the user.

Figure 11:
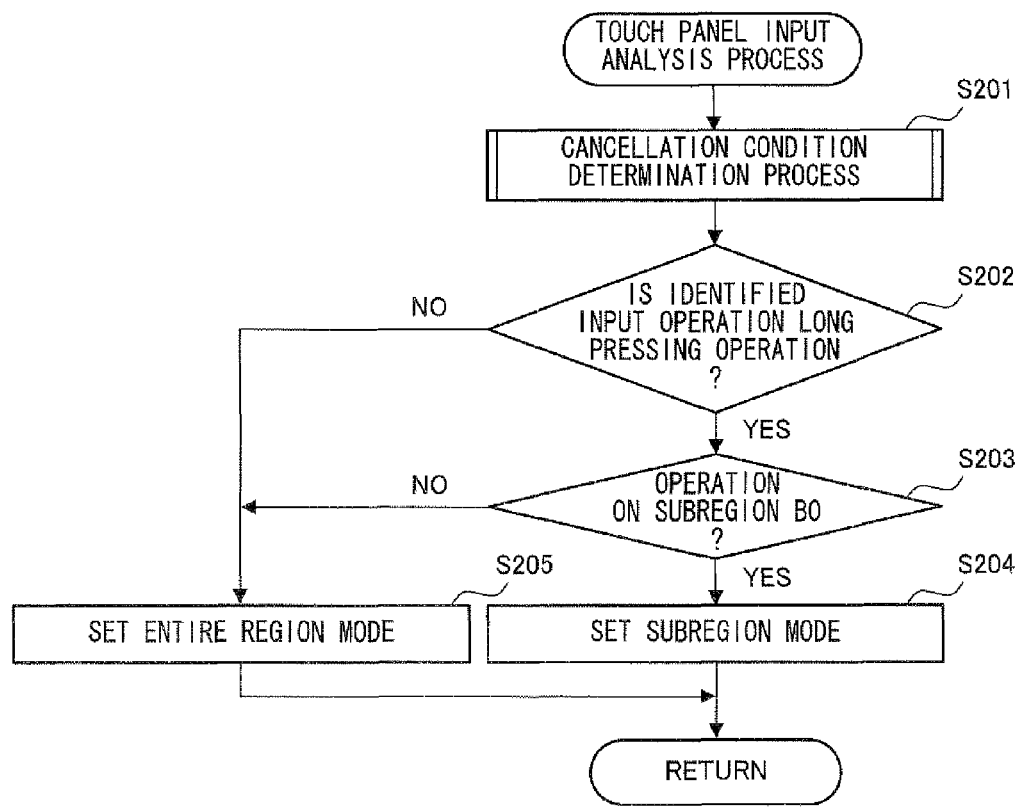
FIG. 11 is a flowchart illustrating details of a touch panel input analysis process in FIG. 10.

The touch panel input analysis process will be described in detail with reference to FIG. 11. FIG. 11 is a flowchart illustrating an example of details of the touch panel input analysis process in FIG. 10.

At step 201, the CPU 311 performs a cancellation condition determination process.

Specifically, on the basis of a series of touch position data including touch position data that is current (this time's) processing target data in the "touch panel input analysis process", the CPU 311 determines whether or not to cancel an operation mode (an operation mode that is set at below-described step 204) that is set on the basis of "previous" processing target data in this process. On the basis of the determination, the operation mode that is set in the "touch panel input analysis process" performed consecutively can be cancelled. Details of step 201 will be described with reference to FIG. 12, after processes at steps 202 to 205 are described.

At step 202, the CPU 311 identifies the type of an input operation and determines whether or not the identified operation is a long pressing operation.

Specifically, first, the CPU 311 determines whether or not the input operation has continuously been performed on the touch panel 13. The CPU 311 can refer to the touch position data 73 and compare the touch position data (n) that is the current processing target to the previous touch position data to determine whether or not the input operation has continuously been performed on the touch panel 13.

When the touch position data continuously exists, the CPU 311 can determine that (I) the user is performing a drag operation or (II) the user is performing a touch operation on the same position.

Here, when comparing the specific coordinates of the touch position data (n) and the previously and continuously obtained touch position data and determining a result of touching the substantially same point, the CPU 311 can determine that a touch operation has been performed on the same position. Here, examples of the case where the substantially same point is continuously touched include the case where the coordinates of the sampled touch position data fall within a predetermined region (examples of the region include, but are not limited thereto, a circle having a center at the current touch position and having a predetermined diameter). Then, when the touch operation is performed on the same position for a predetermined time period or more (specifically, when the number of times the touch position has been obtained before the current touch position data (n) is obtained exceeds a predetermined number), the CPU 311 can determine that a long pressing operation has been performed.

On the other hand, when the coordinates of the continuously sampled touch position data do not fall within the predetermined region, the CPU 311 can determine that a drag operation has been performed at the time when the touch position data (n) is obtained.

It should be noted that the CPU 311 can compare the touch position data (n) to the touch position data (n-1) to determine a shift from a state where the input section is not detecting a touch of a finger or the like on the display section of the input device to a state where the input section is detecting the touch (touch-on). Similarly, the CPU 311 can compare the touch position data (n) to the touch position data (n-1) to determine a shift from a state where the input section is detecting a touch of a finger or the like on the display section of the input device to a state where the input section is not detecting the touch (touch-off).

As described above, at this step, the CPU 311 can refer to the touch position data 73 to determine whether the operation performed on the touch panel 13 is a "long pressing operation", a "drag operation", a "touch-on operation", or a "touch-off operation" at the time when the touch position data (n) is obtained. In addition, the CPU 311 can take into consideration continuity (intermittence) of touch to determine a so-called double click operation.

When the input operation is a "long pressing operation" (YES at step 202), the CPU 311 proceeds to a process at step 203. On the other hand, when the input operation is not a "long pressing operation" (NO at step 202), the CPU 311 proceeds to a process at step 205.

At step 203, the CPU 311 determines whether or not the long pressing operation has been performed on the subregion B0 of the web page A0 on the display surface of the lower LCD 12.

Specifically, the CPU 311 determines whether or not the point at which the long pressing operation is detected is within the subregion B0. More specifically, the CPU 311 determines whether or not the coordinate of the detected point is inside the subregion B0.

Here, when the CPU 311 determines that the long pressing operation has been performed on the subregion B0 (YES at step 203), the CPU 311 proceeds to a process at step 204. On the other hand, when the CPU 311 determines that the long pressing operation has not been performed on the subregion B0 (NO at step 203), the CPU 311 proceeds to a process at step 205.

At step 204, the CPU 311 sets a mode in which the relative position of the web page A0 relative to the display surface of the lower LCD 12 is not changed and only the display form of the map image C0 within the subregion B0 displayed on the display surface can be changed (hereinafter, referred to as subregion mode, for the convenience sake). When the subregion mode is designated and maintained, for example, even if a drag operation is performed from a point within the subregion B0 and then the touched position moves out of the subregion B0 with touch-on maintained, the display form of the image within the subregion B0 can be changed.

At step 205, the CPU 311 sets a mode in which the display form of the map image C0 within the subregion B0 displayed on the display surface is not changed and only the relative position of the web page A0 can be changed (hereinafter, referred to as entire region mode, for the convenience sake).

Figure 12:
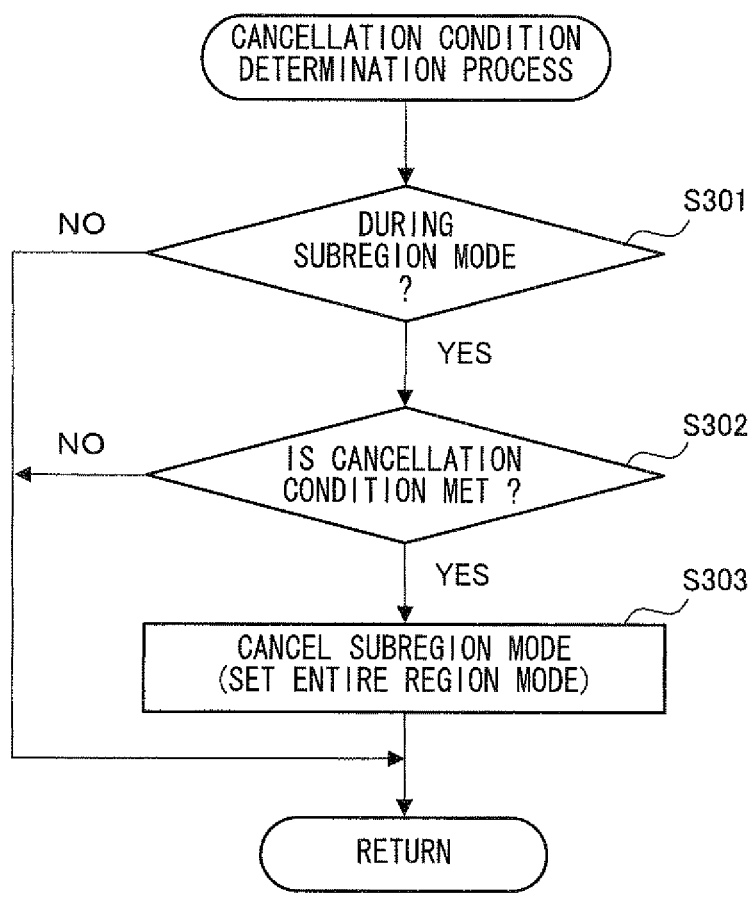
FIG. 12 is an example of a flowchart illustrating processes performed in a cancellation condition determination process.

Here, the aforementioned cancellation condition determination process (step 201) will be described in detail with reference to FIG. 12. FIG. 12 is an example of a flowchart illustrating processes performed in the cancellation condition determination process. Hereinafter, steps 301 to 303 will be described in order.

As described above, at step 201, on the basis of the series of touch position data including the touch position data (n) that is the current (this time's) processing target data in the "touch panel input analysis process", the CPU 311 determines whether or not to cancel the operation mode that is set on the basis of the "previous" processing target data in this process (the operation mode that is set at step 204).

At step 301, the CPU 311 determines whether or not the currently set mode is the "subregion mode".

Specifically, for example, the CPU 311 can refer to current operation mode information that can be stored in the various variables 74 of the main memory 32, to determine the current operation mode. When the CPU 311 determines that the operation mode is the subregion mode (YES at step 301), the CPU 311 proceeds to a process at step 302. On the other hand, when the CPU 311 determines that the operation mode is not the subregion mode (NO at step 301), the CPU 311 ends the cancellation condition determination process.

At step 302, the CPU 311 determines whether or not a cancellation condition is met. Specifically, for example, the CPU 311 can perform the determination process on the basis of the touch position data (n) that is the current processing target data, using a cancellation condition that the current input operation is a touch-on operation and the touch-on position is a position on the display region of the lower LCD 12 other than the subregion B0. When the CPU 311 determines that the cancellation condition is met (YES at step 302), the CPU 311 proceeds to a process at step 303. On the other hand, when the CPU 311 determines the cancellation condition is not met (NO at step 302), the CPU 311 ends the cancellation condition determination process.

At step 303, the CPU 311 performs cancellation of the subregion mode (setting of the entire region mode).

Next, the process at step 103 after the touch panel input analysis process (step 102) will be described with reference to FIG. 10.

At step 103, the CPU 311 performs rendering (the display process) of the content (resource) on the basis of the result of the display object data analysis process and the result of the touch panel input analysis process, for displaying the content on the display device (the upper LCD 22 in the present embodiment).

As described above, in the touch panel input analysis process, the CPU 311 analyzes the touch position data, determines the type of the input operation, and sets the mode concerning the operation target (the subregion mode or the entire region mode). The CPU 311 can calculate, from the touch position data 73, an amount of change of the touch position (coordinate) at the time when the current touch position data (n) is obtained. Therefore, the CPU 311 can display the web page A0 or the map image C0 indicated in the subregion B0 while moving (e.g., scrolling) the web page A0 or the map image C0 on the display surface of the lower LCD 12 in accordance with the amount of change. Which of the web page A0 and the map image C0 indicated in the subregion B0 is selected as an operation target depends on which of the entire region mode and the subregion mode is selected.

(Modifications Etc.)

In the embodiment described above, a long pressing operation or double click operation on a position within the subregion B0 serves as a condition (trigger) for shifting to the subregion mode. However, a long pressing operation or double click operation on a region other than the subregion B0 may serve as a condition (trigger) for shifting to the subregion mode.

In the embodiment described above, the condition that the current input operation is a touch-on operation and the touch-on position is a position on the display region of the lower LCD 12 other than the subregion B0, is used as the condition (trigger) for cancelling the subregion mode. However, the above condition for cancelling the subregion mode may be to establish a long pressing operation or double click operation on the subregion B0, or to establish a long pressing operation or double click operation on a region other than the subregion B0.

Further, in the embodiment described above, an operation on a web page viewed on the hand-held game apparatus on which a touch operation can be performed is mainly described as an example. However, the applicable apparatus is not limited thereto, and the present invention is also applicable to the case where, in various information processing terminals such as stationary game apparatuses, personal computers, and electronic-book readers, a drag operation is performed as described above with a pointing device to scroll a content.

In the embodiment described above, the game apparatus 10 that is a hand-held game apparatus having the touch panel 13 is described as an example. However, in another embodiment, the applicable apparatus is not limited to the hand-held game apparatus, and may be a stationary game apparatus including an input device for pointing to a position on a screen. In this case, instead of the touch panel, an input device as described below can be used as an input section capable of designating a position on the screen of a display section.

For example, the stationary game apparatus displays a video image on a television receiver (referred to as television) or the like, and includes an input device for pointing to a position on the screen of the television. The input device receives infrared light emitted from a marker section installed in the vicinity of the television, to detect a position on the television screen that is pointed to by the user. Alternatively, the input device may emit infrared light, and a photodetector installed in the vicinity of the television may receive the infrared light from the input device, whereby the game apparatus detects a position that is pointed to by the user. The position on the screen that is pointed to by the user is used with such an input device, whereby a process of analyzing an input made with the above input device, which process functions similarly to the touch panel input analysis process described above, can be implemented.

In addition, in the exemplified embodiment described above, the display control program is executed in game processing by using only one apparatus (game apparatus 10). However, in another embodiment, a plurality of display control apparatuses, included in a display control system, which can communicate with each other may share the execution of the display control process.

It should be noted that in the case where the display control program and the like of the present invention are used on a general-purpose platform, the display control program may be provided under the condition that a standard program module provided on the platform is used. It should be understood that even if a function corresponding to such a module as described above is excluded from the display control program, the resultant display control program substantially corresponds to the original display control program as long as the module complements the excluded function.

While the invention has been described in detail, the foregoing description is in all aspects illustrative and not restrictive. It is understood that numerous other modifications and variations can be devised without departing from the scope of the invention. It should be understood that the scope of the present invention is interpreted only by the scope of the claims. It is also understood that, from the description of specific embodiments of the present invention, the one skilled in the art can easily implement the present invention in the equivalent range based on the description of the present invention and on the common technological knowledge. Further, it should be understood that terms used in the present specification have meanings generally used in the art concerned unless otherwise specified. Therefore, unless otherwise defined, all the jargon and technical terms have the same meanings as those generally understood by one skilled in the art of the present invention. In the event of any conflict, the present specification (including meanings defined herein) has priority.

What is claimed is:

1. A computer-readable storage medium having stored therein a display control program that, when executed by a computer capable of using a display section and an input section capable of designating a position on a screen of the display section, causes the computer to perform operations comprising:

displaying at least a part of a first content and a second content that are indicated by display object data that is configured such that a first region defined by the first content includes a second region for displaying the second content;

a first determining, on the basis of a position designated by the input section, whether or not an input operation of a user indicated by the position meets a predetermined criterion; and switching between a first mode in which at least a display form of the first content displayed on the display section is capable of being changed by an input operation on the input section irrespective of whether the input operation is within the second region displayed on the display section, and a second mode in which a display form of the second content within the second region displayed on the display section is capable of being changed by an input operation on the input section, in accordance with a result of the first determining, wherein the first determining occurs during the first mode or the second mode.

2. The non-transitory computer-readable storage medium according to claim 1, wherein the second mode is a mode in which the display form of the first content displayed on the display section is not changed and the display form of the second content within the second region displayed on the display section is capable of being changed by an input operation on the input section.

3. The non-transitory computer-readable storage medium according to claim 1, wherein the first mode is a mode in which the display form of the second content within the second region displayed on the display section is not changed and the display form of the first content displayed on the display section is capable of being changed by an input operation on the input section.

4. The non-transitory computer-readable storage medium according to claim 1, wherein the second content is a content having a area required for a display and the area is larger than a area of the second region.

5. The non-transitory computer-readable storage medium according to claim 1, wherein the first determination means determines, on the basis of a position designated by the input section, determining whether or not an input operation of the user indicated by the position is an input operation in which a position within a predetermined region in the second region is continuously pointed to for a time longer than a set time.

6. The non-transitory computer-readable storage medium according to claim 1, wherein the first determining includes, on the basis of a position designated by the input section, determining whether or not an input operation of the user indicated by the position is an input operation in which a position within a predetermined region in the second region is intermittently and consecutively pointed to within a set time a predetermined number of times or more.

7. The non-transitory computer-readable storage medium according to claim 1, wherein in the first mode, a relative position of the first content relative to the display section is changed in accordance with an input operation on the input section, and in the second mode, the relative position of the second content relative to the second region displayed on the display section is capable of being changed in accordance with an input operation on the input section.

8. The non-transitory computer-readable storage medium according to claim 1, wherein the display control program further causes the computer to operations further comprising a second determining whether or not the input operation meets a second predetermined criterion, after the second mode is set on the basis of the first determining, and when a result of the second determining is positive, the second display control is configured to changes a display form under a setting of the first mode in accordance with a position designated by an input operation after the determining.

9. The non-transitory computer-readable storage medium according to claim 8, wherein the second determining determines whether or not the input operation is an input operation that designates a position outside the second region.

10. The non-transitory computer-readable storage medium according to claim 9, wherein after the second mode is set on the basis of the determining, the second determining configured to determine whether the input operation is not a drag operation performed from a position within the second region to a position outside the second region and is an input operation that designates a position outside the second region.

11. A display control method for controlling a computer capable of using a display section and including an input section capable of designating a position on a screen of the display section, the display control method comprising:

displaying at least a part of a first content and a second content that are indicated by display object data that is configured such that a first region defined by the first content includes a second region for displaying the second content;

determining, on the basis of a position designated by the input section, whether or not an input operation of a user indicated by the position meets a predetermined criterion; and switching between a first mode in which at least a display form of the first content displayed on the display section is capable of being changed by an input operation on the input section irrespective of whether the input operation is within the second region displayed on the display section, and a second mode in which a display form of the second content within the second region displayed on the display section is capable of being changed by an input operation on the input section, in accordance with a result of the determination of the first determination step, wherein the determination occurs during the first mode or the second mode.

12. A display control system capable of using a display section and an input section capable of designating a position on a screen of the display section, the display control system comprising:

first display control configured to display at least a part of a first content and a second content that are indicated by display object data that is configured such that a first region defined by the first content includes a second region for displaying the second content;

first determination module configured to determine, on the basis of a position designated by the input section, whether or not an input operation of a user indicated by the position meets a predetermined criterion; and second display control configured to switch between a first mode in which at least a display form of the first content displayed on the display section is capable of being changed by an input operation on the input section irrespective of whether the input operation is within the second region displayed on the display section, and a second mode in which a display form of the second content within the second region displayed on the display section is capable of being changed by an input operation on the input section, in accordance with a result of the determination of the first determination module, wherein the determination occurs during the first mode or the second mode.

13. A display control apparatus of use with a display section and an input section capable of designating a position on a screen of the display section, the display control apparatus comprising:
first display control configured to display at least a part of a first content and a second content that are indicated by display object data that is configured such that a first region defined by the first content includes a second region for displaying the second content;
first determination module configured to determine, on the basis of a position designated by the input section, whether or not an input operation of a user indicated by the position meets a predetermined criterion; and
second display control configured to switch between a first mode in which at least a display form of the first content displayed on the display section is capable of being changed by an input operation on the input section irrespective of whether the input operation is within the second region displayed on the display section, and a second mode in which a display form of the second content within the second region displayed on the display section is capable of being changed by an input operation on the input section, in accordance with a result of the determination of the first determination module, wherein the determination occurs during the first mode or the second mode.

14. A system, comprising:
an input device comprising a display section and an input section; and
a display control configured to:
display at least a part of a first content and a second content in the display section such that a first region configured to display the first content includes a second region configured to display the second content;
detect a first input operation performed by a user upon a position in a display area of the display section;
determine, on the basis of the position and a length of time associated with the detected first input operation, that the first input operation meets a predetermined criterion for switching a movable content on the input device from the first content to the second content; and
switch, responsive to the determining, from a first mode in which a display form of the first content displayed on the display section is capable of being changed by a second input operation on the input section irrespective of whether the second input operation is within the second region displayed on the display section, to a second mode in which a display form of the second content within the second region displayed on the display section is capable of being changed by a third input operation on the input section, wherein the determining occurs during the first mode or the second mode.

* * * * *